3,387,033
DIFLUORAMINO COMPOUNDS

Richard L. Talbott, White Bear Lake, and Robert J. Koshar, Lincoln Township, Washington County, Minn., assignors to Minnesota Mining and Manufacturing Company, St. Paul, Minn., a corporation of Delaware
No Drawing. Filed Apr. 4, 1966, Ser. No. 540,478
7 Claims. (Cl. 260—583)

ABSTRACT OF THE DISCLOSURE

Very high fluorinated compounds consisting essentially of carbon, nitrogen, oxygen, fluorine and, in some cases also chlorine or bromine, having nitro and difluoramino substitution on a single carbon atom and up to a total of only six carbon atoms. Examples include $$O_2N—CF_2—NF_2$$

and $O_2N—CF(NF_2)_2$.

---

This invention relates to new oxidants and more particularly to oxidants characterized by the difluoraminofluoronitromethyl group:

$$—CF(NO_2)(NF_2)$$

Organic compounds containing the difluoramino group have been investigated in recent years because they are high energy oxidants. These oxidants react with appropriate fuels, such as hydrazine, to release large amounts of chemical energy which may be applied, for examples, as the propulsion energy for a rocket, as explosives or in fuel cells. However, it has been found that higher efficiencies are attained if the composition of oxidant and fuel contains both oxygen and fluorine oxidizing sources. Oxygen serves to oxidize organic carbon atoms to oxides and is commonly provided by an oxygen-containing additive, such as dinitrogen tetroxide ($N_2O_4$), potassium nitrate, and ammonium perchlorate. It is desirable to eliminate the use of additives and therewith various limitations and to incorporate both types of oxidizing groups in the same compound.

It is an object of the present invention to provide novel oxidant compounds containing both the difluoramino group and an oxygen-containing group in the same molecule.

It is a further object of the invention to provide novel oxidant compounds containing the difluoraminofluoronitromethyl group.

Other objects of the invention will be apparent from the disclosure hereinafter.

In accordance with the above and other objects of the invention, a new class of organic oxidant compounds is provided containing both a difluoramino group and a nitro group attached to the same fluorinated carbon atom. These compounds, collectively termed difluoraminofluoronitromethyl compounds, are characterized by substantial freedom from hydrogen and very near saturation with fluorine and by the very general formula

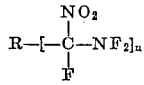

in which R is a suitable residue of valence $n$. The residue R is to be considered suitable when it comprises no groups incompatible with the characteristic $—CF(NF_2)NO_2$ group. It will generally be at least substantially free from hydrogen although a single distal hydrogen atom is contemplated broadly. In general, residues in which all carbon, oxygen and nitrogen atoms are unsubstituted by hydrogen are preferably suitable.

Particularly preferred for energetic content are those substituent R groups which do not establish a carbon-to-carbon bond with the difluoraminofluoronitromethyl group. Among these preferred substituents are simple monovalent groups, e.g., F, Cl, Br, $NF_2$, etc. and more complex monovalent groups in which carbon atoms in the residue are attached, for example, through a N-fluoroamino group.

It will be evident that one or more $—CF(NF_2)NO_2$ groups may be present in a given molecule but it is believed that those in which $n$ is 1 are more readily prepared and are more readily handled. It is contemplated that these compounds are generally available by the oxidation of N,N,N'-trifluoroamidines (compounds containing the

group) using energized fluoroxy compounds and suitable catalyst at temperatures from about $-100$ to $+150°$ C. under autogenous pressure in dispersion in an inert diluent. The process results in augmenting the emperical formula of the starting material by $(O_2)_n$. N,N,N'-trifluoroamidines are obtained by fluorination of suitable amidines formed from nitriles. Other special transformations leading to N,N,N'-trifluoroamidines are known.

The instant invention is not primarily concerned with the manner in which these compounds are formed. Indeed, they may be formed as artifacts during reactions not intended particularly to lead to these novel nitro compounds. For example, difluoraminonitroperfluoromethane has been found among the fractions produced in direct fluorination of ammeline or guanidine salts presumably as the result of some undetermined oxidation reaction.

The process as contemplated may be carried out in vessels of borosilicate glass of convenient size on a small scale, but vessels of stainless steel or other corrosion-resistant material may be used if desired. In general, the reaction mixture may be stirred or agitated. The reaction time required is dependent on the temperature chosen for the reaction but is usually upwards of several minutes and may be as long as several weeks. In general, the energized fluoroxy compound is used in excess. As diluents for the reaction saturated solvents inert toward fluoroxy compounds and difluoramino compounds may be used, for example, perchlorofluorocarbons such as trichlorofluoromethane, perfluorinated compounds such as perfluorotributylamine and perfluorobutylfuran, perfluoroazaalkyl compounds such as bis(difluoramino)perfluoromethane and tris(difluoramino)fluoromethane, and the like. Catalysts useful in the process are essentially anhydrous salts solid at about 25° C., which are free from hydrogen, for example, potassium cyanide.

The compounds of the invention are isolated by conventional means, such as gas chromatography when the products are volatile liquids and liquid column chromatography when the products are less volatile. Alternatively fractional distillation or other conventional techniques may be used with suitable precautions when the reaction is carried out on a larger scale.

The N,N,N'-trifluoroamidino compounds employed as starting materials in the process of the invention have the general formula

where R and $n$ are as hereinbefore described and are prepared by a variety of methods depending on the nature of the R group, including the direct fluorination of highly halogenated amidines; direct fluorination of other nitrogen-containing compounds such as ammeline, guanidine salts, or biguanide salts, and their derivatives; halogenation of perfluoroguanidine; and other reactions of perfluoroguanidine and perfluoroformamidine, such as the reaction of hydrogen cyanide with perfluoroguanidine in the presence of a catalyst to give perfluorocyanoformamidine. (Perfluoroguanidine and perfluoroformamidine are themselves provided by direct fluorination of ammeline or guanidine salts.)

Representative examples of suitable N,N,N'-trifluoroamidino compounds are perfluoroformamidine perfluoroguanidine, perfluorocyanoformamidine, C-bromotrifluoroformamidine, C-chlorotrifluoroformamidine, N,N,N'-trifluorotrichloroacetamidine, N,N,N'-trifluoroperfluorobutyramidine, N,N,N'-trifluoronitrodifluoroacetamidine, and the like.

The energized fluoroxy compounds useful as oxidants include bis(fluoroxy)perfluoromethane, 1,1-bis(fluoroxy)perfluoroethane, perfluoroethyl 1-fluoroxyperfluoroethyl peroxide, bis(1-fluoroxyperfluoroethyl) peroxide, fluoroxyperfluoromethyl perfluoromethyl peroxide, fluoroxybis(perfluoromethylperoxy)perfluoromethane and the like. These compounds are prepared inter alia by direct fluorination of carboxylic acid salts such as sodium oxalate and sodium trifluoroacetate or by the direct fluorination of other appropriate oxygen-containing compounds.

In general, the compounds of the invention are colorless liquids and oils. Those compounds of the invention which have a high molecular weight may be waxy in character or solids. In addition, certain compounds of the invention may be highly colored due to the presence of chromogenic groups in the molecule, which may be modified by the proximity of the difluoroaminofluoronitromethyl group.

The invention is now further described by examples showing the production of specific compounds of the invention. It will be understood that precautionary measures suitable to the reactants are within the skill of the art although set forth in some examples as a guide for those not fully conversant with such measures. In these examples, pressures are indicated in millimeters of mercury although it will be recognized that these systems must not be contaminated by mercury vapors and gauges of suitably non-corrodible metals are therefore employed. In all cases suitable shields and remote control devices are recommended for safety to personnel.

EXAMPLE 1

A clean, dry 10-ml. borosilicate glass reaction vessel equipped with a Fischer and Porter polytetrafluoroethylene valve and a polytetrafluoroethylene-covered magnetic stirring bar is charged with 454.8 mg. of dry reagent potassium cyanide. The reactor is then charged under reduced pressure at —110° C. with 5.95 mmoles of freshly distilled $CFCl_3$ and 2.48 mmoles of pure perfluoroguanidine,

The bath at —110° C. is removed, and the reactor contents are stirred thoroughly while the reactor warms to room temperature. When the suspension is thoroughly mixed, the reactor is cooled in a bath of liquid nitrogen. The reactor is charged under reduced pressure with 5.63 mmoles of pure bis(fluoroxy)perfluoromethane, $$CF_2(OF)_2$$

The reactor is sealed with the Fischer and Porter valve and the liquid nitrogen bath is replaced by a bath initially at —110° C. This bath is allowed to warm slowly to room temperature overnight. The mixture is stirred as it warms to room temperature.

It is convenient and prudent to provide explosion shields around such reaction vessels. In the case of small reactors a cloth or fiberglass shatter-bag with drawstrings may be used to enclose the vessel during the warming. With reactors of the size of this example, barricades or shields of plastic or shatterproof glass are provided.

The mixture is then stirred at room temperature for eight hours and is kept thereafter at —78° C. until worked up.

The volatile products in the reaction mixture are distilled from the reaction vessel and transferred to a manifold under reduced pressure. There is obtained 12.6 mmoles of volatile material. Analysis of a portion of this sample by fluorine N.M.R. spectroscopy shows that the reaction has gone to completion and all of the perfluoroguanidine has been consumed.

The components of the product mixture are separated and isolated by means of vapor phase chromatography. For this purpose a column 3 meters in length and ½ inch in diameter packed with perfluorotributylamine (33 percent) coated on acid washed diatomaceous earth (e.g., Celite; 67 percent) is used. The column is operated at —30° C. An 8-volt thermistor is used as a detector and dry helium is used as the carrier gas. The column is operated in such a manner that the retention time of fluorotrichloromethane is approximately 30 min. after the air peak elutes. Bis(difluoramino)nitrofluoromethane is in the fractions having retention times in excess of 200 minutes which are pooled (by backflushing the chromatography column described above after the $(F_2N)_3CF$ has eluted) and then rechromatographed under different conditions. For this purpose a column 2 meters in length and ½ inch in diameter packed with silicone gum rubber (commercially available as SE–30, from General Electric Company) (20 percent), coated on 30–60 mesh acid-washed diatomaceous earth (80 percent) and maintained at about 25° C. is used. An 8-volt thermistor is used as a detector and helium is used as the carrier gas.

The products are collected by preparative gas chromatography techniques. Previously known compounds are identified by comparison of their infrared and N.M.R. spectra with the spectra of authentic samples.

Bis(difluoramino)nitroperfluoromethane, a novel compound of the invention, is obtained as a colorless gas at room temperature. No decomposition is observed in samples stored at room temperature over a period of several months. It is characterized by strong absorptions in the infrared spectrum at 6.2, 7.8, 10.2, 10.5 and 11.0 microns and in the mass spectrum at $m/e=30$ (assigned to $NO^+$), 31 (assigned to $CF^+$), 33 (assigned to $NF^+$), 46 (assigned to $NO_2^+$), 52 (assigned to $NF_2^+$), and 135 (assigned to $CF_5N_2^+$, i.e. $(F_2N)_2CF-$, the parent molecule minus $NO_2$). Bis(difluoramino)nitroperfluoromethane is an oxidizing agent and must be maintained free from oxidizable contaminants. The molar amount of OF compound used is varied from one to four times the molar amount of perfluoroguanidine charged with little effect on the formation of compounds of the invention.

EXAMPLE 2

The apparatus used in Example 1 is thoroughly cleaned and dried and is then charged with 478.8 mg. of dry reagent potassium cyanide and 0.7 ml. of dry perfluorotributylamine. The reactor is then cooled in a bath of liquid nitrogen and charged under reduced pressure with 3.0 mmoles of pure perfluoroformamidine

at liquid nitrogen temperature. The cooling bath is removed and the reaction vessel is allowed to warm to room temperature while the mixture is stirred for a few minutes to give thorough mixing. This step is a safety procedure found helpful for avoiding explosions. The reactor is then cooled again in a liquid nitrogen bath and charged under reduced pressure with 4.0 mmoles of pure bis(fluoroxy)perfluoromethane. The reactor is sealed with a polytetrafluoroethylene valve and placed in a slush bath at —110° C. which is allowed to warm slowly to room temperature overnight. The reaction mixture is stirred with a magnetic stirring bar as it warms and at room temperature for eight hours thereafter. It is then cooled at —30° C., and the volatile components at that temperature are transferred to the vacuum manifold. The products are fractionated by distillation at less than 1 mm. pressure through traps at about —93° C. and —196° C., respectively.

At the conclusion of the distillation, the —93° C. trap is found to contain 0.16 mmole of product consisting of fluorinated peroxides and trioxides and difluoraminonitroperfluoromethane, as well as small amounts of uncharacterized contaminants. The —196° C. trap contains 5.14 mmoles of products, the principal conponents of which are bis(difluoramino)perfluoromethane and fluoroformyl perfluoromethyl peroxide. The components of both traps are separated by vapor phase chromatography following the procedures described in Example 1.

Difluoraminonitroperfluoromethane may also be purified by vapor phase chromatography using a 5 meter, ½ inch diameter column of Dow Corning fluorosilicone fluid, No. FS–1265, (33 percent) coated on firebrick (67 percent) maintained at 25° C. The retention time relative to $CFCl_3$ is 63.3 ($CFCl_3$ as 100). Under the same conditions perfluoroguanidine has a retention time of 45.2.

Difluoraminonitroperfluoromethane is a colorless gas at room temperature. No decomposition is observed in samples stored at room temperature over a period of several months. This compound is an oxidizing agent and must be maintained free from oxidizable contaminants. The following table summarizes physical and analytical data for difluoraminonitroperfluoromethane.

Difluoraminonitroperfluoromethane, $F_2NCF_2NO_2$

INFRARED SPECTRUM

Absorptions at $3.39\mu$ (vw, $6.16\mu$ (s), $7.59\mu$ (s), $8.08\mu$ (s), $8.96\mu$ (w), $9.22\mu$ (w), $10.15\mu$ (m), $10.63\mu$ (m), $11.85\mu$ (m), $12.72\mu$ (m), and $13.87\mu$ (w).

$F^{19}$ N.M.R. SPECTRUM

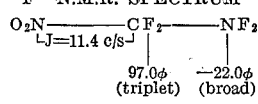

$97.0\phi$    $-22.0\phi$
(triplet)    (broad)

MASS SPECTRUM

Prominent peaks appear at mass numbers (m/e) $30(NO^+)$, $31(CF^+)$, $33(NF^+)$, $46(NO_2^+)$, $50(CF_2^+)$, $52(NF_2^+)$, $64(CNF_2^+)$, $69(CF_3^+)$, $83(CNF_3^+)$ and $102(CNF_4^+$, parent molecule minus $NO_2)$.

EXAMPLE 3

The procedure of Example 2 is repeated employing a different oxidant. The apparatus described in Example 2 is thoroughly cleaned and dried and then charged with 248.3 mg. of dry reagent potassium cyanide and 0.25 ml. of dry perfluorotributylamine. Following the procedure of Example 2, 0.80 mmole of pure perfluoroformamidine is condensed in the reaction vessel, the cooling bath is removed, and the reaction vessel is allowed to warm to room temperature. After the reaction mixture is stirred for a few minutes, the reactor is again cooled to about —196° C. and is charged under reduced pressure with 1.06 mmoles of 1,1 - bis(fluoroxy)perfluoroethane. The reaction procedure and subsequent fractionation procedure of Example 2 are followed except that the first trap is cooled in a slush bath of fluorotrichloromethane at —110° C.

After fractionation, the —110° C. trap is found to contain 0.31 mmole of product which consists of perfluoroacetyl perfluoroethyl peroxide, perfluoroacetyl perfluoromethyl peroxide, fluoroformyl perfluoroethyl peroxide and difluoraminonitroperfluoromethane, as well as small amounts of other components.

The components of the —110° C. trap are separated and isolated by vapor phase chromatography using a 6 meter column of silicone gum rubber similar to the 2 meter silicone gum rubber column described in Example 1 and following the procedures described therein.

Difluoraminonitroperfluoromethane prepared in this manner is identified by its infrared and N.M.R. spectra and found to be identical to samples prepared by the techniques described in Example 2.

EXAMPLES 4–18

By the procedures of Examples 1–3, employing convenient energized fluoroxyperfluoroalkanes and suitable catalysts and diluents, the N,N,N′-trifluoroamidino compounds tabulated below are converted into the corresponding compounds containing the difluoraminofluoronitromethyl group as indicated in the tabulation. In general, the transformations are accomplished in the temperature range —50 to +50° C. The products are isolated by the methods described hereinbefore and are characterized by their infrared and N.M.R. spectra and by their mass cracking patterns.

| | N,N,N′-trifluoroamidino compounds used as starting materials | Difluoraminofluoronitromethyl compounds |
|---|---|---|
| 4 | $BrC(=NF)-NF_2$ | $BrC(NO_2)(F)-NF_2$ |
| 5 | $ClC(=NF)-NF_2$ | $ClC(NO_2)(F)-NF_2$ |
| 6 | $CF_3CF_2CF_2C(=NF)-NF_2$ | $CF_3CF_2CF_2C(NO_2)(F)-NF_2$ |
| 7 | $F_2NCFNFC(=NF)-NF_2$ | $F_2NCFNFC(NO_2)(F)-NF_2$ |
| 8 | $CF_3NFC(=NF)-NF_2$ | $CF_3NFC(NO_2)(F)-NF_2$ |
| 9 | $F_2NCF_2NFC(=NF)-NF_2$ | $F_2NCF_2NFC(NO_2)(F)-NF_2$ |
| 10 | $CF_3C(=NF)-NF_2$ | $CF_3C(NO_2)(F)-NF_2$ |
| 11 | $N\equiv CC(=NF)-NF_2$ | $N\equiv CC(NO_2)(F)-NF_2$ |
| 12 | $Cl_3CC(=NF)-NF_2$ | $Cl_3CC(NO_2)(F)-NF_2$ |
| 13 | $O_2NCF_2C(=NF)-NF_2$ | $O_2NCF_2C(NO_2)(F)-NF_2$ |
| 14 | $CF_3(CF_2)_4C(=NF)-NF_2$ | $CF_3(CF_2)_4C(NO_2)(F)-NF_2$ |
| 15 | $HCF_2(CF_2)_3C(=NF)-NF_2$ | $HCF_2(CF_2)_3C(NO_2)(F)-NF_2$ |
| 16 | $BrCF_2C(=NF)-NF_2$ | $BrCF_2C(NO_2)(F)-NF_2$ |
| 17 | $O(CF_2CF_2C(=NF)-NF_2)_2$ | $O(CF_2CF_2C(NO_2)(F)-NF_2)_2$ |
| 18 | $ClCF_2C(=NF)-NF_2$ | $ClCF_2C(NO_2)(F)-NF_2$ |

The compounds of the invention are useful as oxidants, and in particular they are useful in bringing both fluorine and oxygen to the oxidation reaction for more efficient oxidation of the material to be oxidized. The compounds of the invention are particularly useful in place of complex mixtures of compounds containing difluoramino groups and compounds containing oxygen-oxidizing groups in that homogeneity of the system is preserved without the limitations imposed by solubility and incompatibility conditions. This homogeneity provides better control of the oxidation processes.

What is claimed is:

1. A compound having 1–6 carbon atoms consisting essentially of carbon, nitrogen, oxygen and halogen atoms with atomic numbers below 40, at least 3 of the halogen atoms being fluorine and not more than 3 of the halogen atoms having atomic numbers between 15 and 40, and characterized (a) by substantial freedom from hydrogen and (b) by the presence of difluoramino and nitro groups attached to the same fluorinated carbon atom.

2. A compound according to claim 1 in which a difluoraminonitrofluoromethyl group is attached to carbon in a sequence of from 1 to about 6 carbon atoms substituted by no more than one distal hydrogen atom.

3. A compound according to claim 1 in which there are two terminal difluoraminonitrofluoromethyl groups attached to the ends of a divalent linking group.

4. A compound according to claim 1 consisting of carbon, nitrogen, fluorine, and oxygen in which each carbon atom over one is separated from the closest other carbon atoms by an at least divalent atom other than carbon.

5. A compound according to claim 1 in which the only carbon present is in the difluoraminonitrofluoromethyl group.

6. The compound difluoroaminonitroperfluoromethane.

7. The compound bis(difluoramino)nitrofluoromethane.

References Cited

UNITED STATES PATENTS 3,149,165  9/1964  Sausen _____ 260—583

OTHER REFERENCES

Banks, Fluorocarbons and Their Derivatives, Oldbourne Press, London, 1964, pages 85–88.

Mitsch, J. Heterocyclic Chem., vol. 1, No. 5, December 1964, pp. 233–4.

CHARLES B. PARKER, *Primary Examiner.*

CARL D. QUARFORTH, *Examiner.*

L. A. SEBASTIAN, R. L. RAYMOND,
*Assistant Examiners.*